United States Patent [19]

Shepherd

[11] Patent Number: 4,573,559
[45] Date of Patent: Mar. 4, 1986

[54] SUBWAY ELECTRIC MOTOR AND FAN CONSTRUCTION

[75] Inventor: Michael Shepherd, Carmel, Ind.

[73] Assignee: Wallace Murray Corporation, New York, N.Y.

[21] Appl. No.: 457,462

[22] Filed: Jan. 12, 1983

[51] Int. Cl.[4] .......................... F16D 31/00; H02K 9/06
[52] U.S. Cl. ................................ 192/58 B; 192/82 T; 310/62
[58] Field of Search ............... 192/58 B, 82 T, 103 R, 192/103 FA; 310/62, 63, 76, 77; 105/59

[56] References Cited

U.S. PATENT DOCUMENTS

| | | | |
|---|---|---|---|
| 2,086,306 | 7/1937 | Sessions | 219/85 |
| 2,699,846 | 1/1955 | Pitman et al. | 192/58 B |
| 2,922,098 | 1/1960 | Hutson | 310/52 |
| 2,948,268 | 8/1960 | Roper et al. | 192/58 B |
| 3,559,786 | 2/1971 | Long | 192/58 B |
| 3,670,190 | 6/1972 | Goebel | 310/60 |
| 3,725,706 | 4/1973 | Lukens | 310/62 |
| 4,064,980 | 12/1977 | Tinholt | 192/58 B |
| 4,110,643 | 8/1978 | Muller | 310/54 |
| 4,311,937 | 1/1982 | Clark | 310/268 |

Primary Examiner—Rodney H. Bonck
Assistant Examiner—Alan G. Towner
Attorney, Agent, or Firm—Thomas J. Greer, Jr.

[57] ABSTRACT

An electric motor construction particularly for subway train electric motors which utilize fan induced air cooling to cool the motor windings. The invention exhibits utility in saving power to drive the fan. The fan is coupled to the motor armature by a fluid coupling. The fluid coupling is so constructed that at relatively high temperatures the torque delivered to the fan by the motor armature does not increase proportionally or correspondingly as at relatively low rotor speeds. On one embodiment, a fluid coupling utilizing variation of shear liquid viscosity with both temperature and shear rate is employed. In a second embodiment, the amount of fluid in the fluid coupling is varied with variations in temperature.

4 Claims, 7 Drawing Figures

SUBWAY ELECTRIC MOTOR AND FAN CONSTRUCTION

This invention relates to electric motors and more particularly to electric motors whose windings are cooled by internal fan induced air flow. The invention exhibits particular utility for electric motors used to drive railroad vehicles such as subway trains, such motors typically producing about 100 horsepower.

In a typical electric motor construction, the housing or stator is provided with field windings, with the armature or rotor also provided with windings, the armature or rotor carrying a shaft which is coupled to the apparatus driven by the motor. The armature is provided with a plurality of vanes, interiorly of the motor housing, the vanes bolted or otherwise fixed to the armature. The vanes usually function in the manner of a centrifugal fan, namely, in a manner forcing air radially outwardly. The motor housing as well as the armature is provided with passageways for the flow of cooling air therein, the air carrying away heat generated in the windings by virtue of electric current passing through them, this being the common $I^2R$ heating effect. While apparently satisfactory for many types of motor operation, particularly constant speed motor applications, this arrangement has been found to be wasteful of energy in certain applications such as subway trains wherein the motor is a variable speed motor. Examples of fixed vane motor constructions are shown in U.S. Pat. Nos. 2,086,306 to Juergens, 3,670,190, to Goebel, 3,725,706 to Lukens and 4,311,937 to Clark.

In a constant-speed electric motor, the cooling air flow requirement may be calculated, given for example maximum ambient temperature, and the fan vane structure accordingly designed to yield the necessary flow of air to cool the motor. However, in the case of variable speed electric motors, such as those on subway trains, this type of fan construction can cause appreciable loss of power. With the cooling fan blades fixed to the rotor or armature, the fan blades necessarily turn at the same speed as the rotor. The fan is typically designed to supply sufficient cooling air at partial motor speeds, where the heat load is known to be a maximum. As motor speed increases, the heat load is reduced, yet both the fan air flow and power consumption increase rapidly. Unless some provision is made for decreasing the power consumed by the fan blades or vanes, the vanes continue to consume power at relatively high motor speeds, even though substantially reduced air flow would be sufficient to supply the required cooling effect on the motor.

According to the practice of this invention, an electric motor for a subway train is provided internally with a fan driven by a fan coupling. At speeds below a predetermined speed or a predetermined speed range, the relationship between rotor speed increase and fan speed increase is fairly linear. That is to say, as the electric motor increases in speed, the fan also increases in speed, thereby delivering corresponding increase of motor cooling air to the motor. However, at speeds above a predetermined speed or a predetermined speed range, the action of the fluid coupling is such that further increases in rotor speed do not result in corresponding increases of fan speed. By virtue of this construction and arrangement, significant savings in power to the fan are realized. On one embodiment of the invention, a typical subway train motor running at a speed of 3,000 rpm, a saving of 5 horsepower (otherwise lost to the fan) is realized. At still higher motor speeds, the saving is proportionately more. Even at lower motor speeds, there is a saving in power lost to the fan. In another embodiment, at the same 3,000 rpm motor speed, the horsepower required to drive the fan according to the practice of this invention is approximately 2½ horsepower. With a conventional fan, i.e., one turning at the same speed as the rotor, approximately 10 horsepower is lost to the fan.

In one embodiment of the invention, the fluid for the fluid coupling is selected so that, within the range of operation of the motor, the viscosity (and hence the ability to transmit torque) of the fluid decreases with increasing temperature and with increasing shear rate. The increase of temperature of shear liquid is predominantely caused by an increase in the shear rate, thus being a function of the speed of the armature of the motor.

In a second embodiment, the fluid coupling is provided with a temperature responsive valve, such as one provided with a bimetal element, so that the amount of shear liquid in the fluid coupling available for transmitting torque changes with temperature. The construction is such that at relatively low motor temperatures, when motor cooling demands are relatively small, the amount of shear media available for the transmission of torque is reduced. At relatively high motor temperatures, wherein the demand for cooling air is greatest for the motor, the amount of shear media available in the coupling is increased by the action of the temperature sensitive valve, so as to thereby supply greater cooling air to the motor.

IN THE DRAWINGS

Figure 1:
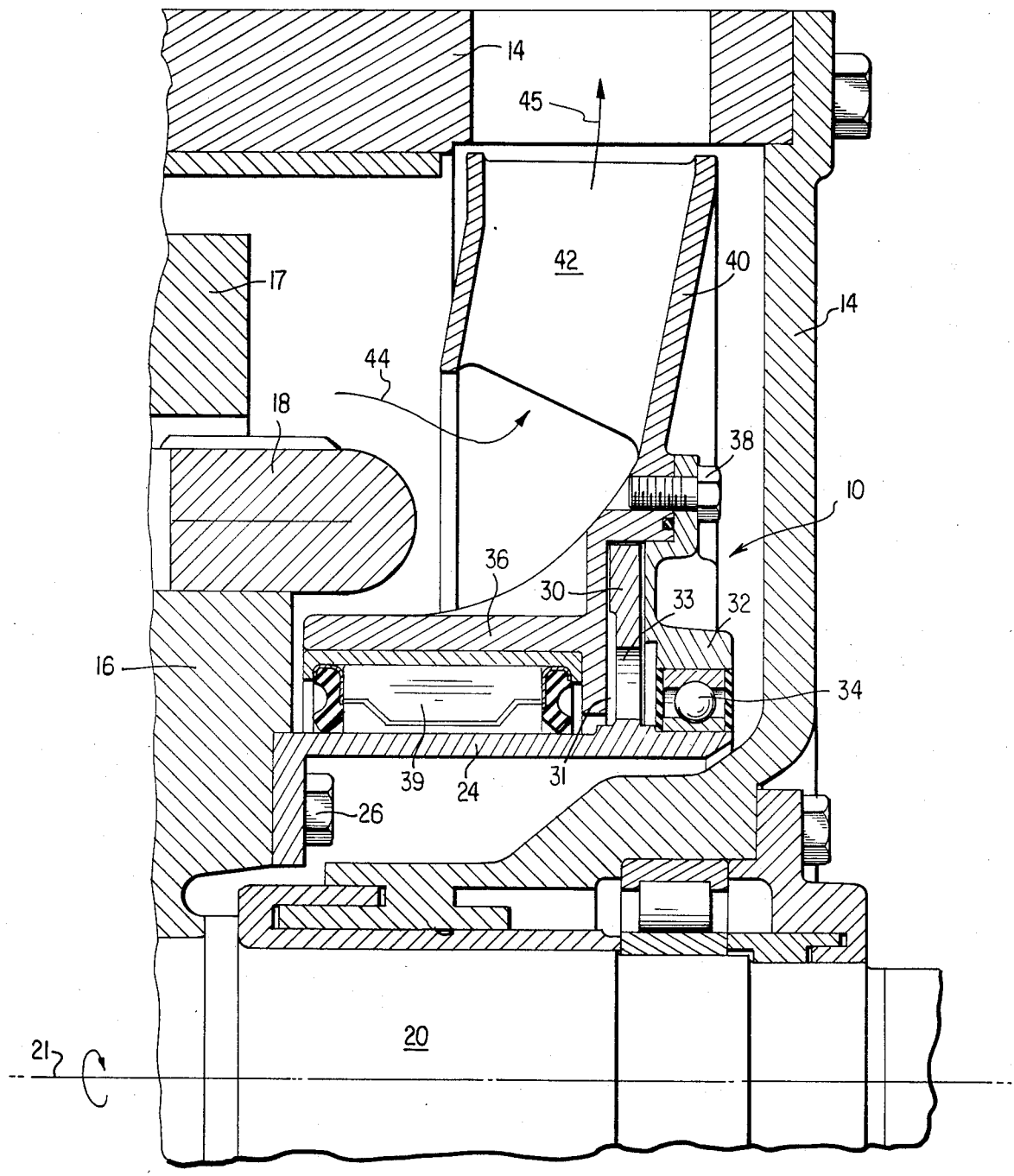
FIG. 1 is a partial cross-sectional view of a subway train electric motor provided with a fluid coupling to drive its cooling fan, according to one embodiment of this invention.

Referring now to FIG. 1 of the drawings, the numeral 10 denotes generally the fluid coupling of this invention according to a first embodiment, the coupling being employed with a conventional electric motor used in subway trains, as for example, a GE 1557 F motor marketed by General Electric. The numeral 14 denotes a portion of the frame or housing of the motor, the motor being provided with the usual armature 16, field element 17 and an armature winding 18, the armature being coupled to or carrying a rotary output shaft 20. The shaft is coupled by suitable gearing to the driving wheels of the subway train. The numeral 24 denotes an annular bracket or hub secured to armature 16 by a plurality of angularly spaced bolts 26, with a driving disc 30 secured to or integral with bracket 24. The arrangement of these elements is such that as armature 16 and shaft 20 rotate, disc 30 rotates, the plane of rotation of disc 30 being at right angles to the axis of rotation 21 of the shaft. Disc 30 rotates within an annular drive chamber 31 filled with a viscous shear fluid. The numeral 32 denotes an annular plate element of the fluid coupling 10, while the numeral 34 denotes an annular bearing provided with the indicated fluid sealing elements. The numeral 36 denotes a cylindrical portion of coupling 10, with angularly spaced bolts 38 fastening portion 32 to portion 36. An annular bearing 39 provided with the indicated fluid sealing elements is positioned between hub 24 and portions 36. Chamber 31 is defined by portions of elements 32 and 36. The numeral 40 denotes a portion of one of a plurality of angularly disposed fan vanes 42, which may be integral with portion 36. Vanes 42 may be fashioned of aluminum, by way of example only.

Upon rotation of armature 16 and shaft 20, disc 30 rotates within annular chamber 31. By virtue of the viscosity of the shear liquid in chamber 31, portions 32 and 36 of coupling 10 rotate, at a speed proportional to the speed of portion 24, carrying with them the plurality of angularly disposed vanes 42. The rotation of vanes 42 within housing 14 of the electric motor causes air to be drawn through openings in the housing at the upstream end (not illustrated) of the motor, as indicated by curved arrow 44. Openings in the downstream end of the motor housing (one of which is shown) permit air to be drawn into and to pass out of the motor interior, the latter indicated by the numeral 45, as is conventional. The electric motor is air colled, as is conventional, with the fan vanes positioned at the downstream end of the cooling flow of air. In this manner, the cooling action of the fan vanes is made dependent on the amount of heat generated by the motor coils, such heat changing the temperature of the air flowing through the motor. It will easily be observed that the rotation of fan vanes 42 relative to portion 24 and hence relative to armature 16 and output shaft 20 depends upon the nature of the shear coupling between driving disc 30 and the walls of fan drive chamber 31.

Figure 2:
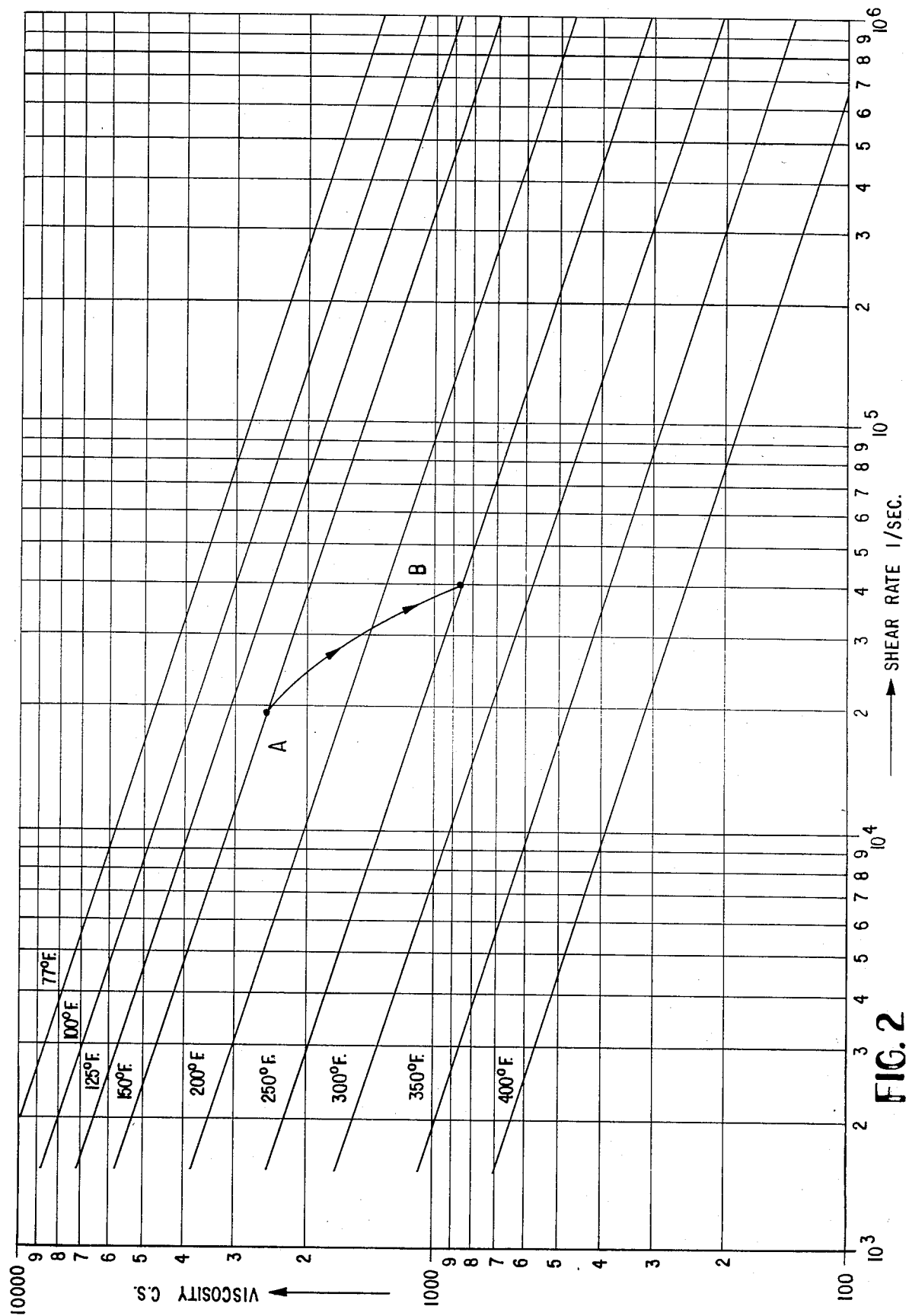
FIG. 2 illustrates the dependence of viscosity on temperature and shear rate, this dependence being utilized in carrying out the invention according to the first embodiment.

FIG. 2 of the drawings illustrates how the viscosity of a typical shear liquid in chamber 31 changes with temperature of the shear liquid and with shear rate. The particular shear liquid behavior illustrated is that of one marketed under the tradename Dow 211, being a silicone shear liquid marketed by Dow Chemical Company. The viscosity of the liquid decreases with both increase in temperature and increase in shear rate. Assuming, within a typical range of electric motor operation, a temperature of 150° F. with a first shear rate of $2 \times 10^4$/sec. at point A (relatively high torque transmission), with the viscosity of the shear liquid decreasing at 250° F. with a second and higher shear rate of $4 \times 10^4$/sec. at point B. The point of operation of the fluid coupling 10 then shifts from point A to point B (relatively lower torque transmission). The viscosity having diminished, the transmission of torque from the armature and shaft to the fan vanes 42 through the shear liquid in the fluid coupling also decreases.

The mode of operation of the embodiment illustrated at FIGS. 1 and 2 is as follows. At a relatively low subway train speed, as for example 10 miles per hour, the point of operation of the fluid coupling 10 would be at or near point A of FIG. 2. The angularly disposed fan blades 42 (which typically may be 15 to 25 in number) rotate and cause air, indicated by 44 at FIG. 1, to pass through openings in the motor housing to thereby assist in carrying heat away from the motor interior. At a higher subway train speed, for example, 60 miles per hour, the point of operation of the fluid coupling 10 will shift to point B of FIG. 2. The degree of fluid coupling will now be less at point B, and accordingly there will be a non-linear relationship between the speed of the rotor 16 and the speed of rotation of vanes 42. At such higher rotor speeds, corresponding to a subway train speed of 60 miles per hour, cooling air is still required, however not as much cooling air is required as would be pulled through the motor by vanes 42, were the vanes 42 rigidly connected to the rotor 16, as is the case with prior art constructions. The higher speed of the subway train motor, corresponding to point B of FIG. 2, will increase the shear rate. This increase in shear rate increases the temperature of the shear media. Thus, the point of operation of the coupling shifts from A to B.

Figure 3:
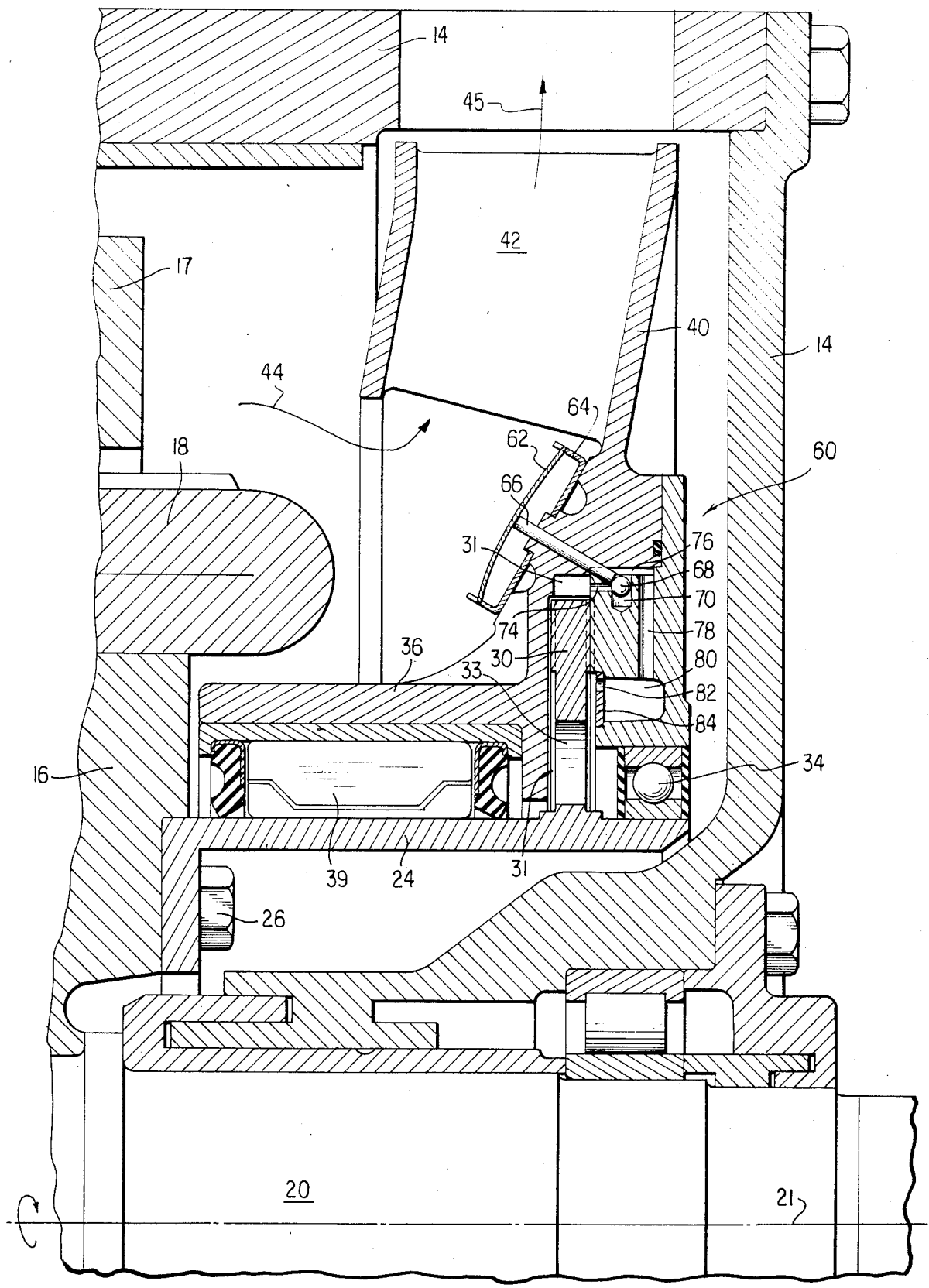
FIG. 3 is a view similar to FIG. 1 and showing a second embodiment, the second embodiment utilizing a temperature responsive coupling.

Referring now to FIG. 3 of the drawings, a second embodiment of the invention is illustrated. The electric motor structure is the same, however, a different form of fluid coupling is employed. The numeral 60 denotes a fluid coupling according to this embodiment of this invention, the coupling including a conventional temperature responsive bi-metal 62 which controls a valve which in turn controls the amount of shear fluid in chamber 31 available to transmit torque from driving disc 30 to portions of the coupling which carry vanes 42. The bi-metal element ends are mounted on a U-shaped bracket 64 rigidly secured to point 36. A control pin 66 extends through a passage in portion 36, one end of the pin being in contact with the mid point of bi-metal 62 with its other end abutting valve ball 68. The latter is formed typically of metal or other rigid material and moves radially inwardly and radially outwardly (vertically as shown at FIG. 3) in passageway 70 depending upon whether it is urged radially inwardly by control pin 66 (downwardly in FIG. 3) or whether it remains in a radially outward position (as shown at FIG. 3) due to centrifugal force during motor operation. In this position it blocks the flow of shear liquid which ordinarily would pass through axially extending bores 74 and 76, radially extending bore 78, shear fluid reservoir chamber 80 and opening 82 in plate 84, into drive disc chamber 31 and thence back into axial bore 74. The movement of shear liquid from the radially outermost portion of drive chamber 31 into axially extending bore 74 is effected by a conventional dam or flow deflector, not illustrated. The reader will observe that the valve 68, 70 for controlling the amount of shear liquid in the drive chamber is positioned downstream of the drive disc 30. This is in distinction to the usual valve location in fluid couplings for driving a fan in a cylinder and piston engine, such couplings being classified in the U.S. Patent Office in Class 192, Subclass 58, International Class F16D 35/00.

In operation, at relatively low ambient temperatures (ambient being taken with respect to the air 44 flowing in the vicinity of the bi-metal 62) control pin 66 will urge ball 68 radially inwardly (down in FIG. 3) along bore 70. This will result in an unobstructed flow of the shear liquid in a clockwise direction as shown at FIG. 3, with the attendant transmission of a relatively small amount of torque from drive disc 30 through the shear liquid and thence to the walls of drive chamber 31, to thus cause the fan vanes 42 to rotate. At relatively high ambient temperatures bimetal 62 becomes more bowed, with control pin 66 moving away from ball 68, the latter now moving radially outwardly under the action of centrifugal force to thereby block the flow of shear liquid in the clockwise flow path. Shear liquid now builds up in the drive chamber 31, its volume therein increasing, with an attendant relatively large amount of torque transmitted to the rotary fan vanes 42 by drive disc 30. At intermediate positions of ball 68 in bore 70, corresponding to intermediate ambient temperatures, correspondingly intermediate amounts of torque will be transmitted to rotate fan vanes 42.

Figure 4:
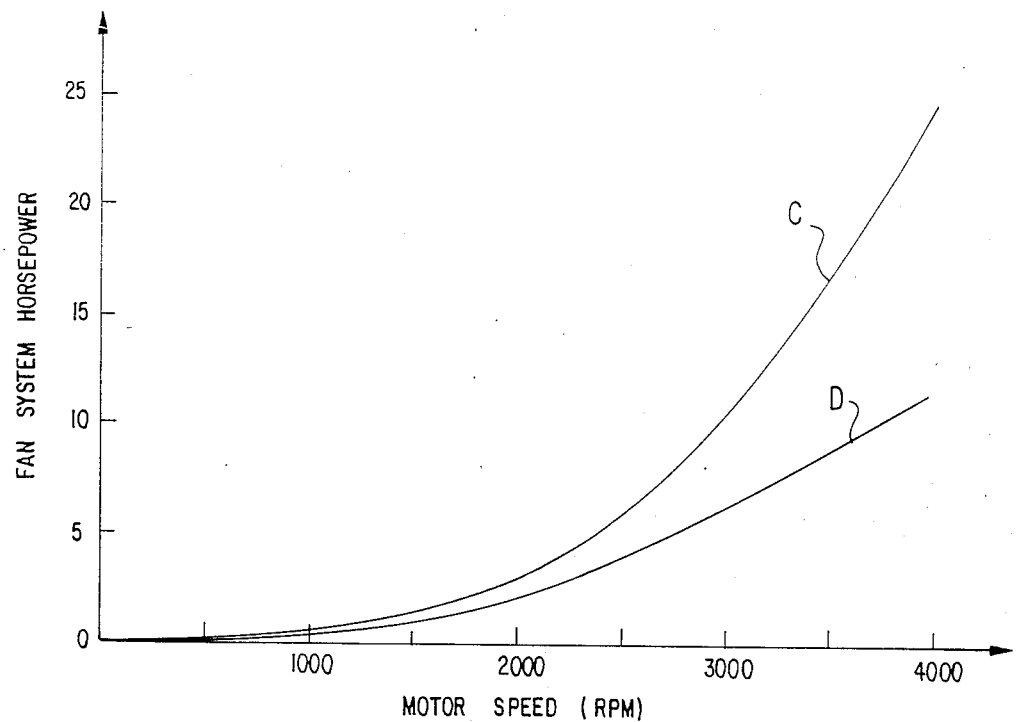
FIG. 4 illustrates the power saving realized by the practice of this invention with the embodiment of FIG. 1.

FIG. 4 illustrates the saving power for the torque limiter shown at FIG. 1 at motor speeds in the range up to 4,000 rpm and for the electric motor described. At 3,000 rpm, approximately 10 horsepower is required to drive the fan vanes of a motor of conventional construction, i.e., a fan whose vanes or blades are rigidly attached to the armature. This is shown at curve C. By contrast, at curve D, the reader will observe that, for example, at 3,000 rpm, approximately 6 horsepower is required to drive the fan provided with the coupling of FIG. 1.

Figure 5:
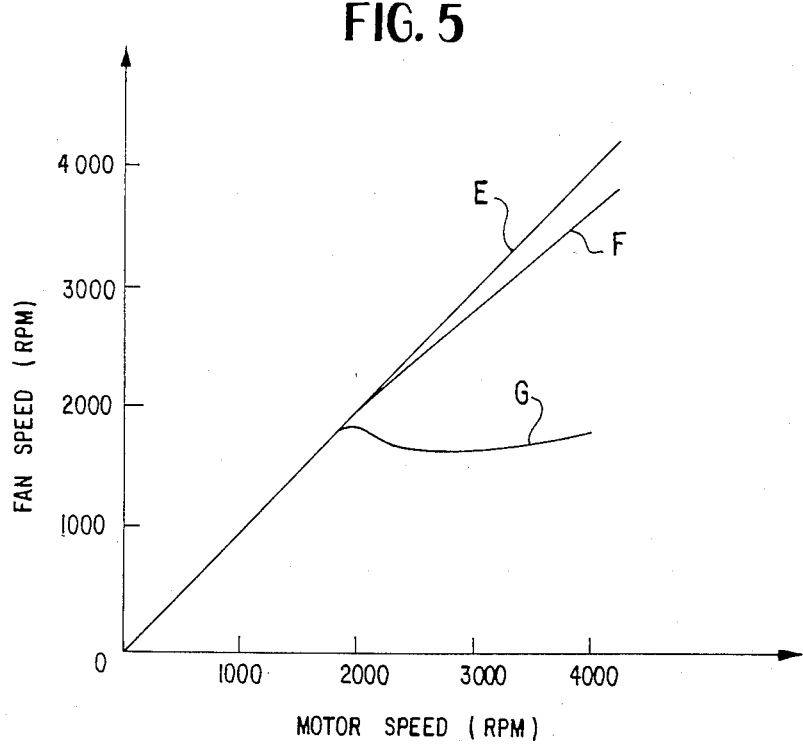
FIGS. 5 and 6 illustrate the improved performance and power saving, respectively, realized by the practice of this invention with the embodiment of FIG. 3.

FIG. 5 illustrates the performance of the same electric motor both with and without the fluid drive of FIG. 3. Curve E shows the performance with a typical prior art fixed fan vane motor. Curve F shows the performances of the motor and fluid coupling of FIG. 3, when the ambient temperature is greater than $T_c$, the temperature at which the ball 68 blocks and shear liquid builds up in chamber 31 to yield maximum fluid coupling. Curve G shows the corresponding performance when the ambient temperature is less than $T_c$, i.e., the fluid coupling 60 is at maximum disengagement (least torque transmission). The reader will observe that the fan speed at curve G does not rise appreciably beyond about 1,900 rpm. There is a linear relation between motor speed and fan speed with conventional, prior art fan blades, i.e., those rigidly attached to the armature or the shaft. Curve F shows some power saving behavior, even when ambient temperature is greater than $T_c$.

Figure 6:
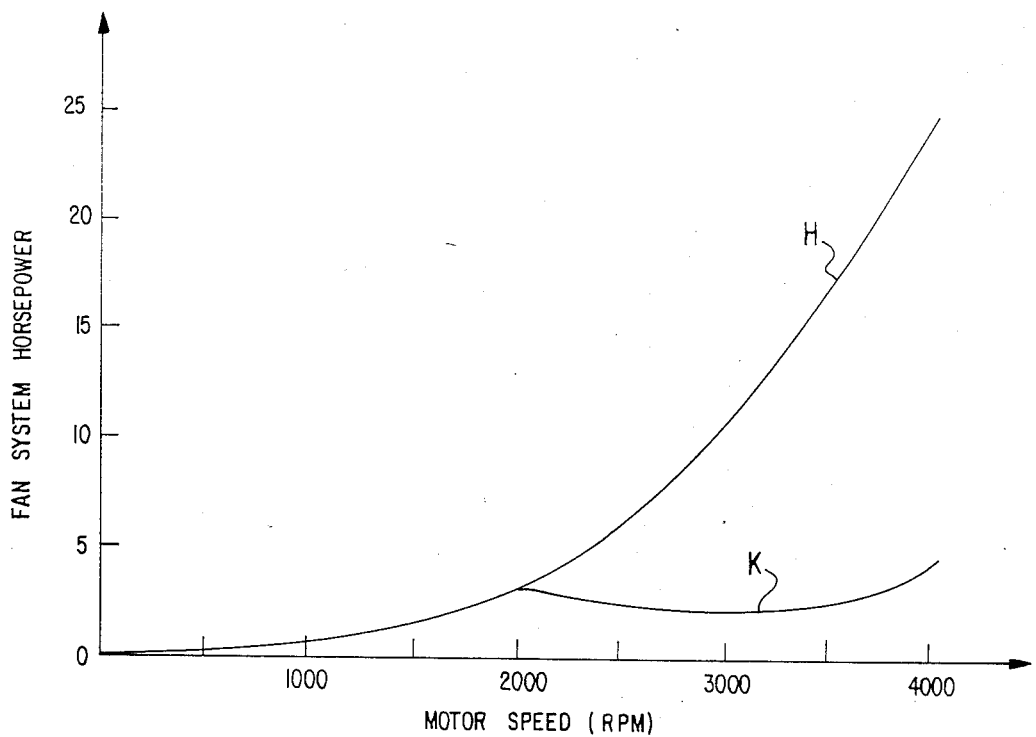

FIG. 6 illustrates, for the same motor, the saving in horsepower with the fluid fan drive of FIG. 3. Prior art constructions having fixed vane fan blades require about 10 horsepower at 3,000 rpm to drive the fan vanes as shown at curve H. When ambient temperature is less than $T_c$ (fluid coupling disengaged) the horsepower required to turn the fan vanes is only about 2.5 horsepower, as shown at curve K.

Figure 7:
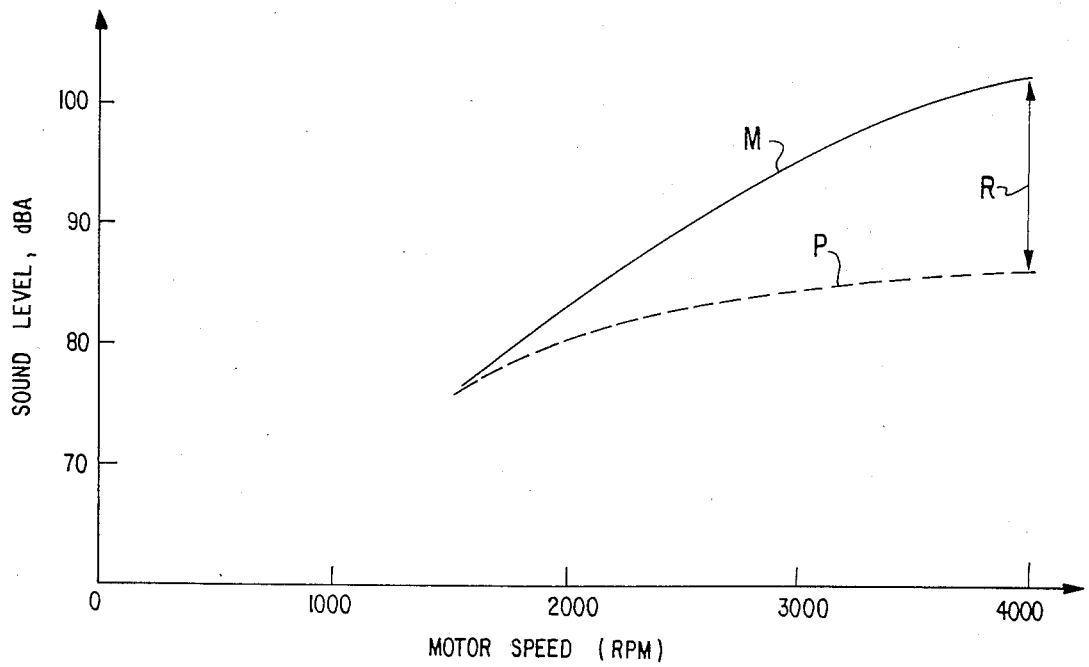
FIG. 7 illustrates the reduction of overall motor noise level enjoyed by the practice of this invention with the embodiment of FIG. 3.

FIG. 7 illustrates the reduction in sound level of the same motor, with the fan drive of FIG. 3, comparing fan-induced noise both without (curve M) the fluid coupling of this invention and with it, curve P, at ambient temperature less $T_c$. The reduction is denoted by R and is about 17 DBA at 4,000 rpm. The curves of FIGS. 4 to 7 are constructed from calculated data based on empirical results.

It is claimed:

1. A temperature controlled fan fluid coupling for connection between an adjustable speed electric motor and a fan coupled to the motor armature interiorily of the motor, the motor having an armature, field and armature windings, and openings in the motor housing for the passage of air along and through the interior of the motor, wherein the motor is cooled by the fan whenever the motor ambient temperature exceeds a predetermined value, the coupling including a drive disc rigidly coupled to the motor armature for rotation therewith, the fan rigidly carried by a hub element, the latter having a drive chamber at least partially filled with a viscous shear fluid, the drive chamber receiving the drive disc, the fan rotating upon rotation of the drive disc by virtue of the shear liquid transmitting from the drive disc to the hub element, a reservoir chamber hydraulically coupled to the drive chamber, a fluid return path between a radially outermost part of the driving chamber and the reservoir chamber, a temperature responsive valve arrangement for blocking and for unblocking the fluid return path to thereby vary the amount of viscous shear liquid in the driving chamber and hence vary the amount of torque transmitted from the drive disc to the fan, a valve ball movable into and out of the fluid return path to thereby block and to unblock it, the valve ball held in one of its positions by centrifugal force upon rotation of the fan, the ball moved to its other position by the action of a temperature responsive device carried by the hub element.

2. The coupling of claim 1 wherein the valve ball moves along a substantially radial path.

3. The coupling of claim 1 wherein the valve ball is held in its blocking position by centrifugal force upon rotation of the fan.

4. The coupling of claim 1 wherein the valve ball is positioned downstream of the drive disc in the fluid return path.

* * * * *